United States Patent
Park et al.

(10) Patent No.: US 11,723,016 B2
(45) Date of Patent: Aug. 8, 2023

(54) PHYSICAL SIDELINK CHANNEL PACKET-BASED SYNCHRONIZATION

(71) Applicant: QUALCOMM Incorporated, San Diego, CA (US)

(72) Inventors: Cheol Hee Park, San Diego, CA (US); Arvind Vardarajan Santhanam, San Diego, CA (US); Moshe Ben-Ari, Rehovot (IL); Alexander Sverdlov, Rehovot (IL); Shmuel Vagner, Raanana (IL); Gideon Shlomo Kutz, Ramat Hasharon (IL); Lior Uziel, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/308,885

(22) Filed: May 5, 2021

(65) Prior Publication Data

US 2021/0352686 A1 Nov. 11, 2021

Related U.S. Application Data

(60) Provisional application No. 63/021,668, filed on May 7, 2020.

(51) Int. Cl.
| | |
|---|---|
| *H04J 11/00* | (2006.01) |
| *H04W 72/1263* | (2023.01) |
| *H04W 56/00* | (2009.01) |
| *H04W 72/20* | (2023.01) |
| *H04W 92/18* | (2009.01) |

(52) U.S. Cl.
CPC ..... *H04W 72/1263* (2013.01); *H04W 56/002* (2013.01); *H04W 72/20* (2023.01); *H04W 92/18* (2013.01)

(58) Field of Classification Search
CPC ......... H04W 72/1263; H04W 72/1278; H04W 56/002; H04W 92/18
See application file for complete search history.

(56) References Cited

U.S. PATENT DOCUMENTS

| | | | | |
|---|---|---|---|---|
| 2017/0288759 A1* | 10/2017 | Namgoong | .......... | H04B 7/0639 |
| 2019/0053305 A1* | 2/2019 | Saiwai | ................ | H04L 5/0053 |
| 2019/0150147 A1* | 5/2019 | Lee | ................... | H04W 72/0446 |
| | | | | 370/336 |
| 2019/0223241 A1* | 7/2019 | Manolakis | .......... | H04W 72/542 |
| 2019/0239178 A1* | 8/2019 | Shilov | ................ | H04W 56/002 |
| 2020/0245281 A1* | 7/2020 | Chae | ........................ | H04L 27/26 |
| 2020/0267692 A1* | 8/2020 | Wu | ........................ | H04W 8/005 |
| 2021/0105760 A1* | 4/2021 | Chen | ................... | H04L 27/2601 |
| 2021/0176720 A1* | 6/2021 | Chae | ................... | H04W 56/004 |

(Continued)

*Primary Examiner* — Chi H Pham
*Assistant Examiner* — Vladislav Y Agureyev
(74) *Attorney, Agent, or Firm* — Danai Nelisile Mhembere; Holland & Hart LLP

(57) ABSTRACT

Methods, systems, and devices for wireless communications are described. The method includes communicating control signaling scheduling a sidelink transmission via a physical sidelink channel, receiving, by a first user equipment (UE), the sidelink transmission including one or more reference signals from a second UE via the physical sidelink channel based on the control signaling, and monitoring the physical sidelink channel based on time synchronization, frequency synchronization, or both, determined using the one or more reference signals.

29 Claims, 11 Drawing Sheets

(56) References Cited

U.S. PATENT DOCUMENTS

| | | | |
|---|---|---|---|
| 2021/0195543 A1* | 6/2021 | Lee | H04W 56/0015 |
| 2021/0235396 A1* | 7/2021 | Jung | H04W 52/48 |
| 2021/0243713 A1* | 8/2021 | Ellenbeck | H04W 56/0015 |
| 2021/0329603 A1* | 10/2021 | Zhao | H04W 72/0406 |
| 2021/0344454 A1* | 11/2021 | Lee | H04L 1/1692 |
| 2021/0360520 A1* | 11/2021 | Chen | H04W 48/20 |
| 2021/0360551 A1* | 11/2021 | Kwak | H04L 5/0048 |
| 2021/0377893 A1* | 12/2021 | Khoryaev | H04L 5/0053 |
| 2021/0377912 A1* | 12/2021 | El Hamss | H04L 1/1854 |
| 2021/0377943 A1* | 12/2021 | Park | H04W 72/0453 |
| 2022/0110067 A1* | 4/2022 | Ryu | H04W 24/08 |
| 2022/0110074 A1* | 4/2022 | Zhao | H04W 52/383 |
| 2022/0159590 A1* | 5/2022 | Lee | H04L 5/0094 |
| 2022/0159599 A1* | 5/2022 | Hakola | H04W 56/0025 |
| 2022/0191825 A1* | 6/2022 | Nord | H04W 68/02 |
| 2022/0191962 A1* | 6/2022 | Di Girolamo | H04W 36/305 |

\* cited by examiner

PHYSICAL SIDELINK CHANNEL PACKET-BASED SYNCHRONIZATION

CROSS REFERENCE

The present Application for Patent claims the benefit of U.S. Provisional Patent Application No. 63/021,668 by PARK et al., entitled "PHYSICAL SIDELINK CHANNEL PACKET-BASED SYNCHRONIZATION," filed May 7, 2020, assigned to the assignee hereof, and expressly incorporated by reference herein.

BACKGROUND

The following relates generally to wireless communications, and more specifically to physical sidelink channel packet-based synchronization.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may lose a connection to a synchronization source (e.g., synchronization source outage, etc.). In some examples, parameters for transmissions configured based on the synchronization source may be relatively strict. In some examples, a transmission sent after loss of the synchronization source may detrimentally impact communication throughput.

SUMMARY

The described techniques relate to improved methods, systems, devices, or apparatuses that support physical sidelink channel packet-based synchronization. Generally, the described techniques provide for improvements to signal synchronization based on a device losing a connection to a synchronization source (e.g., synchronization source outage, etc.). In some examples, a first UE may lose synchronization with a synchronization source. In some examples, the described techniques include the first UE determining a time synchronization or frequency synchronization, or both, based on one or more packet transmissions from a second UE that has maintained its synchronization. For example, the first UE may communicate control signaling scheduling a sidelink transmission via a physical sidelink channel. The first UE may receive the sidelink transmission comprising one or more reference signals from a second UE via the physical sidelink channel in accordance with the control signaling. The first UE may use the one or more reference signals for determining time synchronization or frequency synchronization, or both, for communicating with the second UE.

A method of wireless communication is described. The method may include communicating control signaling scheduling a sidelink transmission via a physical sidelink channel, receiving, by a first UE, the sidelink transmission including one or more reference signals from a second UE via the physical sidelink channel based on the control signaling, and monitoring the physical sidelink channel based on time synchronization, frequency synchronization, or both, determined using the one or more reference signals.

An apparatus for wireless communication is described. The apparatus may include a processor, memory coupled with the processor, and instructions stored in the memory. The instructions may be executable by the processor to cause the apparatus to communicate control signaling scheduling a sidelink transmission via a physical sidelink channel, receive, by a first UE, the sidelink transmission including one or more reference signals from a second UE via the physical sidelink channel based on the control signaling, and monitor the physical sidelink channel based on time synchronization, frequency synchronization, or both, determined using the one or more reference signals.

Another apparatus for wireless communication is described. The apparatus may include means for communicating control signaling scheduling a sidelink transmission via a physical sidelink channel, receiving, by a first UE, the sidelink transmission including one or more reference signals from a second UE via the physical sidelink channel based on the control signaling, and monitoring the physical sidelink channel based on time synchronization, frequency synchronization, or both, determined using the one or more reference signals.

A non-transitory computer-readable medium storing code for wireless communication is described. The code may include instructions executable by a processor to communicate control signaling scheduling a sidelink transmission via a physical sidelink channel, receive, by a first UE, the sidelink transmission including one or more reference signals from a second UE via the physical sidelink channel based on the control signaling, and monitor the physical sidelink channel based on time synchronization, frequency synchronization, or both, determined using the one or more reference signals.

In some examples of the method, apparatuses, and non-transitory computer-readable medium described herein, receiving the sidelink transmission may include operations, features, means, or instructions for receiving, based on the control signaling, the one or more reference signals in one or more reference signal symbol periods allocated within a resource of the physical sidelink channel for the sidelink transmission.

Some examples of the method, apparatuses, and non-transitory computer-readable medium described herein may further include operations, features, means, or instructions for receiving synchronization confidence information from the second UE, where the time synchronization may be determined using the one or more reference signals based on a synchronization confidence level satisfying a confidence threshold.

In some examples of the method, apparatuses, and non-transitory computer-readable medium described herein, receiving the synchronization confidence information may include operations, features, means, or instructions for receiving the synchronization confidence information in an application layer message from the second UE.

Some examples of the method, apparatuses, and non-transitory computer-readable medium described herein may further include operations, features, means, or instructions for receiving, by the first UE, a second sidelink transmission including one or more reference signals from a third UE, and receiving second synchronization confidence information from a third UE, where the time synchronization may be determined without using the one or more reference signals of the second sidelink transmission based on a second synchronization confidence level not satisfying a confidence threshold.

Some examples of the method, apparatuses, and non-transitory computer-readable medium described herein may further include operations, features, means, or instructions for receiving location information of the second UE, where the time synchronization may be determined based on the location information.

Some examples of the method, apparatuses, and non-transitory computer-readable medium described herein may further include operations, features, means, or instructions for estimating a distance between the second UE and the first UE based on the location information, where the time synchronization may be determined based on the estimated distance.

In some examples of the method, apparatuses, and non-transitory computer-readable medium described herein, the location information includes a zone identification of the second UE.

In some examples of the method, apparatuses, and non-transitory computer-readable medium described herein, receiving the location information may include operations, features, means, or instructions for receiving a safety message including the location information.

Some examples of the method, apparatuses, and non-transitory computer-readable medium described herein may further include operations, features, means, or instructions for receiving location information from a set of UEs including the second UE, where the time synchronization may be determined based on the location information for the set of UEs.

Some examples of the method, apparatuses, and non-transitory computer-readable medium described herein may further include operations, features, means, or instructions for estimating a statistical distance metric based on the location information for the set of UEs, where the time synchronization may be determined based on the statistical distance metric.

Some examples of the method, apparatuses, and non-transitory computer-readable medium described herein may further include operations, features, means, or instructions for estimating a frequency offset based on the one or more reference signals, where the frequency synchronization may be determined based on the estimated frequency offset.

Some examples of the method, apparatuses, and non-transitory computer-readable medium described herein may further include operations, features, means, or instructions for receiving a set of sidelink transmissions from a set of UEs including the second UE, and determining a set of frequency offsets, where each frequency offset may be determined for a respective sidelink transmission of the set of sidelink transmissions, and where the frequency synchronization may be determined based on the set of frequency offsets.

Some examples of the method, apparatuses, and non-transitory computer-readable medium described herein may further include operations, features, means, or instructions for estimating a distance between the second UE and the first UE based on a transmission power associated with the sidelink transmission, where the time synchronization may be determined based on the estimated distance.

Some examples of the method, apparatuses, and non-transitory computer-readable medium described herein may further include operations, features, means, or instructions for estimating a pathloss based on the sidelink transmission.

Some examples of the method, apparatuses, and non-transitory computer-readable medium described herein may further include operations, features, means, or instructions for estimating a distance between the first UE and the second UE based on the estimated pathloss, where the time synchronization may be determined based on the estimated distance.

Some examples of the method, apparatuses, and non-transitory computer-readable medium described herein may further include operations, features, means, or instructions for determining a received signal strength associated with the sidelink transmission, and estimating the pathloss based on the determined received signal strength.

In some examples of the method, apparatuses, and non-transitory computer-readable medium described herein, the received signal strength includes a received signal strength indicator (RSSI), a reference signal received power (RSRP) associated with the sidelink transmission, or both.

Some examples of the method, apparatuses, and non-transitory computer-readable medium described herein may further include operations, features, means, or instructions for determining, by the first UE, a loss of synchronization with a synchronization source, where the time synchronization, the frequency synchronization, or both, may be determined using the one or more reference signals of the sidelink transmission based on the loss of synchronization.

Some examples of the method, apparatuses, and non-transitory computer-readable medium described herein may further include operations, features, means, or instructions for determining the time synchronization based on, descrambling a symbol of a first reference signal of the one or more reference signals, extracting the descrambled symbol of the first reference signal in frequency domain, determining a channel impulse response based on the extracted descrambled symbol, and determining a time delay estimate based on the determined channel impulse response.

Some examples of the method, apparatuses, and non-transitory computer-readable medium described herein may further include operations, features, means, or instructions for estimating a timing drift based on the one or more reference signals, where the time synchronization may be determined based on the estimated timing drift.

In some examples of the method, apparatuses, and non-transitory computer-readable medium described herein, the physical sidelink channel includes a physical sidelink control channel or a physical sidelink shared channel.

In some examples of the method, apparatuses, and non-transitory computer-readable medium described herein, the one or more reference signals include at least one demodulation reference signal (DMRS).

DETAILED DESCRIPTION

The present techniques provide improvements to signal synchronization based on a device losing a connection to a synchronization source (e.g., synchronization source outage, etc.). The present techniques include physical sidelink channel packet-based synchronization. In some examples, the physical sidelink channel may include physical sidelink control channel (PSCCH) or physical sidelink shared channel (PSSCH)). In some examples, time synchronization of a first UE may be determined based on the first UE receiving one or more packet transmissions from at least one other UE (e.g., at least a second UE) that has maintained its synchronization. In some examples, the first UE may compensate for propagation delay based on a distance to a second UE that transmitting the one or more packet transmissions (e.g., a transmitter to receiver (Tx-Rx) distance between the first UE and the second UE). The Tx-Rx distance may be determined based on location information (e.g., zone identification of the first UE and zone identification of the second UE, etc.). In some examples, zone identification information may be included in sidelink control information (SCI). In some examples, frequency error or frequency drift of the first UE caused by loss of synchronization may be compensated based on frequency error estimation determined by a packet transmission of the second UE that is received by the first UE. In some examples, frequency error may be compensated based on wireless wide area network (WWAN) concurrency and frequency tracking loop (FTL) usage.

Aspects of the disclosure are initially described in the context of a wireless communications system. Aspects of the disclosure are further illustrated by and described with reference to a wireless communications system, an environment, a timing diagram, and a process that relate to physical sidelink channel packet-based synchronization. Aspects of the disclosure are further illustrated by and described with reference to apparatus diagrams, system diagrams, and flowcharts that relate to physical sidelink channel packet-based synchronization.

Figure 1:
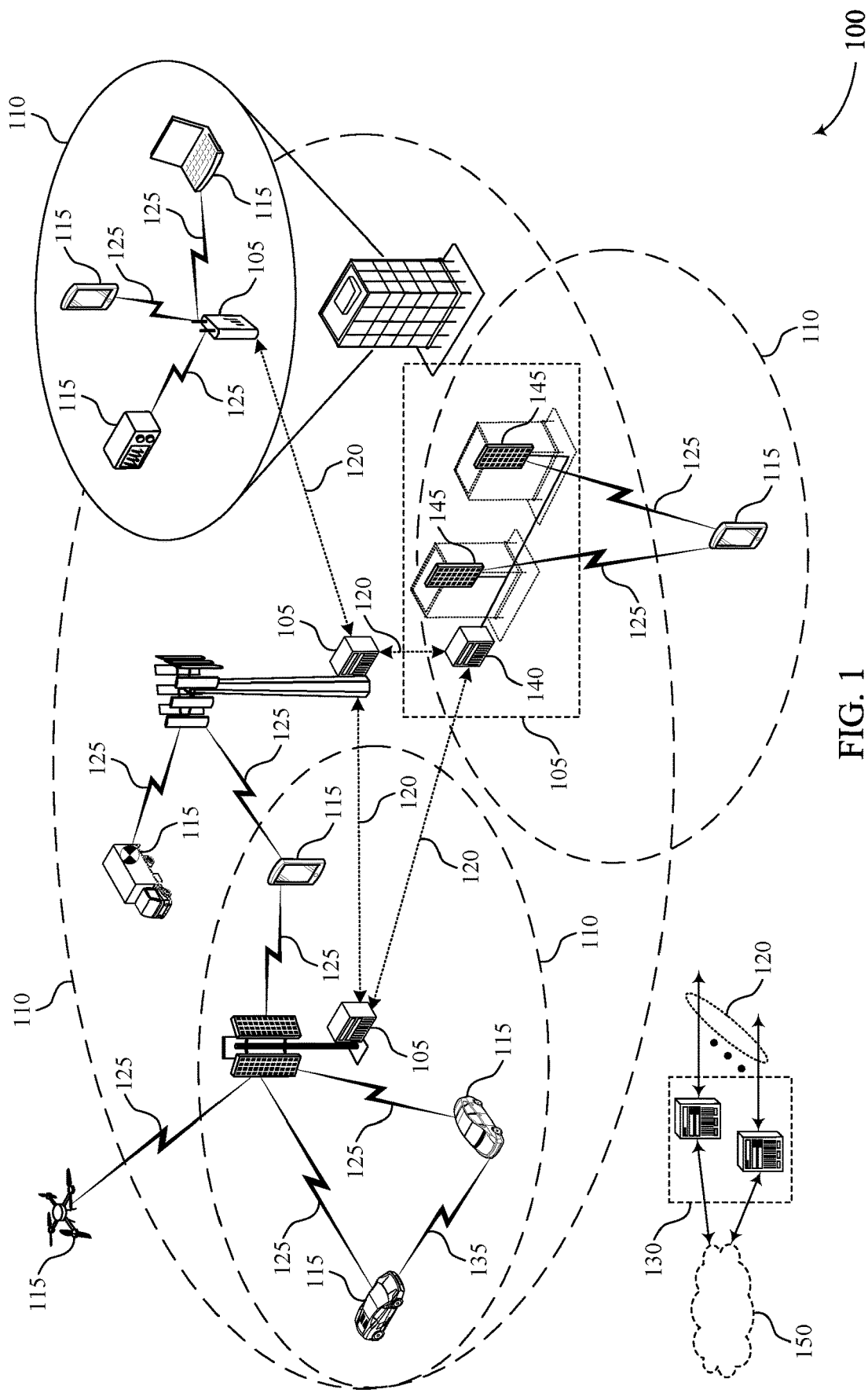
FIG. 1 illustrates an example of a system for wireless communications in accordance with aspects of the present disclosure.

FIG. 1 illustrates an example of a wireless communications system 100 that supports avoiding packet data convergence protocol holes for bearer in dual connectivity mode across multiple radio access technologies in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a first UE (e.g., a first UE 115 of FIG. 1) may communicate with a second UE (e.g., a second UE 115 of FIG. 1) based on a configuration (e.g., cellular vehicle to everything (C-V2X) configuration). In some examples, the first UE may lose synchronization with a synchronization source (e.g., a C-V2X synchronization source, a GNSS synchronization source, a serving cell, a primary cell (PCell), eNB, gNB, synchronization reference (SyncRef) UE, sidelink synchronization signal, (SLSS), physical sidelink broadcast channel (PSBCH), etc.). In some examples, C-V2X synchronization conditions may be relatively stringent. In some examples, the first UE may synchronize based on one or more packet transmissions from the second UE. In some instances, control signaling scheduling may be communicated between the first UE (e.g., an unsynchronized UE) and the second UE (e.g., a synchronized UE) over a physical sidelink channel. In some examples, the control signaling scheduling may include control signaling, or a control channel, or a shared data channel, or a shared data transmission, or any combination thereof.

In some examples, the first UE may determine a time synchronization, a frequency synchronization, or both, based on one or more sidelink transmissions the first UE receives from the second UE over the physical sidelink channel. In some examples, the first UE may receive control sidelink transmissions or data sidelink transmissions, or both, via a control sidelink channel or data sidelink channel, or both. In some instances, the first UE may monitor the physical sidelink channel based on the time synchronization or the frequency synchronization, or both. In some examples, after losing communication with a synchronization source the first UE may regain or maintain synchronization based on the monitoring of the physical sidelink channel. Thus, the present techniques improve synchronization (e.g., C-V2X synchronization) by enabling a UE to regain and maintain synchronization after losing communication with a synchronization source.

It is noted that the techniques described herein are not limited to a particular format or configuration (e.g., V2X, C-V2X, etc.), but may be used for any sidelink transmission that includes reference signals that may be used for time synchronization or frequency synchronization, or both.

Figure 2:
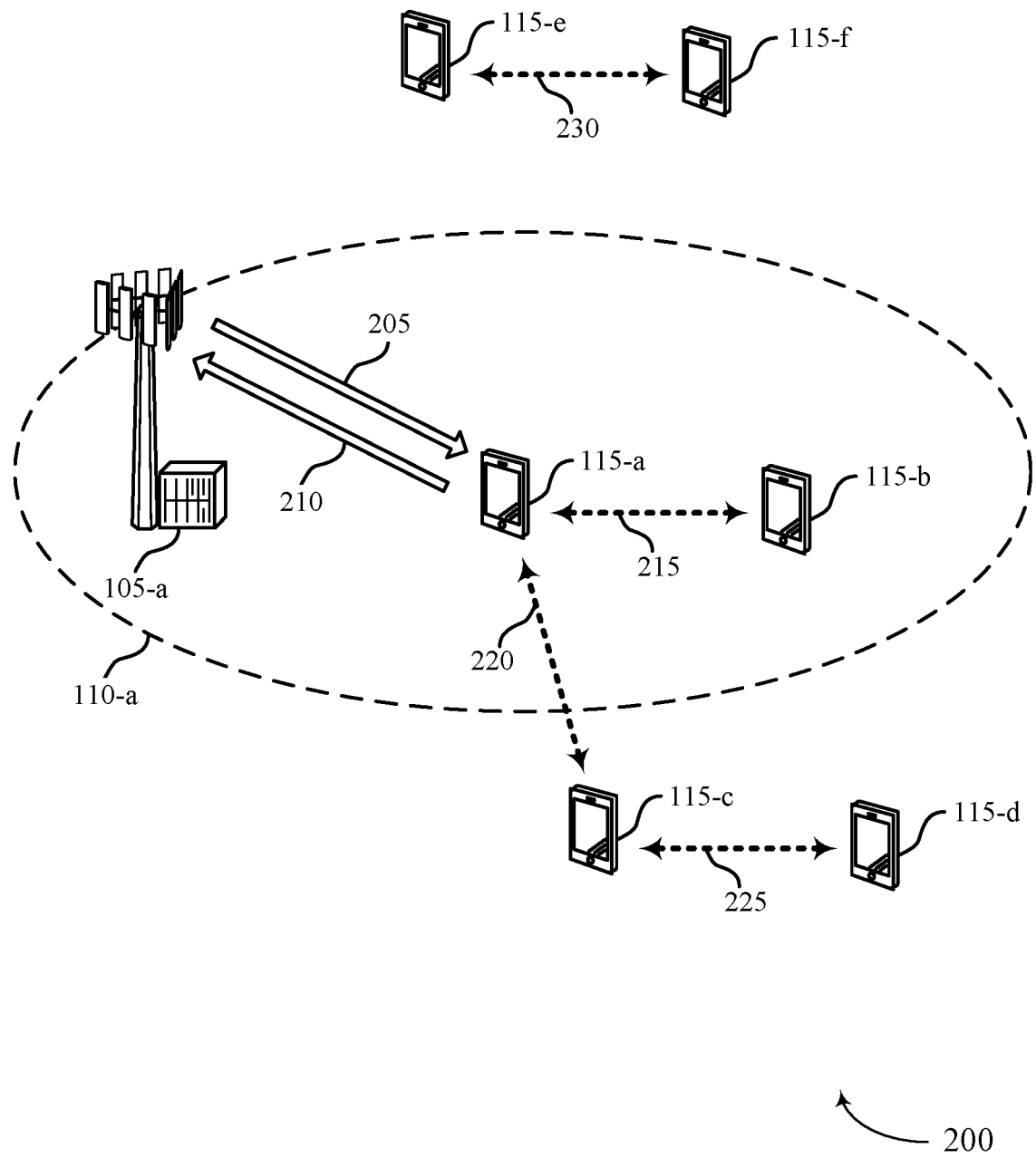
FIG. 2 illustrates an example of a wireless communications system in accordance with aspects of the present disclosure.

FIG. 2 illustrates an example of a wireless communications system 200 that supports physical sidelink channel packet-based synchronization in accordance with aspects of the present disclosure. In some examples, wireless communications system 200 may implement aspects of wireless communications system 100.

As illustrated, wireless communications system 200 may include UE 115-a, UE 115-b, UE 115-c, UE 115-d, UE 115-e, UE 115-f, and base station 105-a, any of which may be an example of a UE 115 or a base station 105, respectively, as described herein with reference to FIG. 1. As shown, UE 115-a and UE 115-b remain within coverage of base station 105-a, UE 115-c and UE 115-d are in partial coverage (via UE 115-a), and UE 115-e, and UE 115-f are out of coverage. Wireless communications system 200 may also include downlink 205 and uplink 210. Base station 105-a may use downlink 205 to convey control or data information, or both, to UE 115-a. And UE 115-a may use uplink 210 to convey control or data information, or both, to base station 105-a. In some cases, downlink 205 may use different time or frequency resources, or both, than uplink 210.

In some examples, UE 115-a and UE 115-b may maintain synchronization with one or more synchronization sources. Examples of synchronization sources include one or more base stations (e.g., base station 105-a), one or more satellites (e.g., global navigation satellite system (GNSS), etc.), or any combination thereof. After UE 115-a or UE 115-b is synchronized to a synchronization source, UE 115-a or UE 115-b may verify that the physical sidelink channel transmission timing offset is within a preset range (e.g., ±391 nanosecond) of a reference timing of the synchronization source. In some examples, UE 115-a or UE 115-b may verify that a modulated carrier frequency for sidelink transmissions are accurate to within a preset range (e.g., ±0.1 parts per million) observed over a period of one time slot (e.g., 0.5 milliseconds) as compared to a reference frequency of the synchronization source. However, when loss of synchronization occurs (e.g., outage of a synchronization source, GNSS outage, etc.), UE transmissions may be suspended because a transmission by an unsynchronized UE may impact other devices in the same network (e.g., a same C-V2X network). In some examples, C-V2X transmission may specify accurate timing (e.g., very accurate) to operate physical layer procedures, as a wrong transmission may impact overall C-V2X networks.

In some examples, UE 115-*b* may lose synchronization (e.g., synchronization source outage, etc.). In some examples, UE 115-*b* may communicate (e.g., transmit, receive, or both) control signaling with UE 115-*a*, where the UE 115-*b* uses the control signaling to schedule a sidelink transmission via a physical sidelink channel 215 between UE 115-*b* and UE 115-*a*. In some examples, the control signaling may include control signaling, or a control channel, or a shared data channel, or a shared data transmission, or any combination thereof. Examples of physical sidelink channel 215 may include physical sidelink control channel (PSCCH) or physical sidelink shared channel (PSSCH), or both. Based on the control signaling, UE 115-*b* may receive from UE 115-*a* a sidelink transmission over physical sidelink channel 215 that includes one or more reference signals. In some examples, UE 115-*b* may receive from UE 115-*a* control sidelink transmissions or data sidelink transmissions, or both, via a control sidelink channel or data sidelink channel, or both. The sidelink transmission may be one or more packets communicated via a control channel (e.g., a PSCCH), a data channel (e.g., a PSSCH), or both. In some examples, one or more aspects of the described techniques may be implemented based on 5G NR C-V2X. In some examples, the UE 115-*a* may implement 5G NR C-V2X physical sidelink control channel (PSCCH) and/or physical sidelink shared channel (PSSCH) packets-based synchronization.

In some examples, UE 115-*b* may determine a time synchronization, a frequency synchronization, or both, based at least in part on the one or more reference signals. In some examples, UE 115-*b* may monitor the physical sidelink channel 215 based on the time synchronization, the frequency synchronization, or both. Thus, UE 115-*b* may compensate for loss of a synchronization source by physical sidelink channel packet-based synchronization. In some examples, UE 115-*b* may determine the time synchronization based on packet transmissions from at least UE 115-*a* (e.g., and a synchronization maintained by UE 115-*a*). In some examples, propagation delay caused by UE 115-*b* losing synchronization may be compensated by UE 115-*b* estimating a distance between UE 115-*b* and UE 115-*a* (e.g., Tx-Rx distance).

In some examples, UE 115-*b* may use location information to estimate the distance between UE 115-*b* and UE 115-*a*. In some examples, UE 115-*a* may transmit sidelink control information to UE 115-*b* over physical sidelink channel 215. In some examples, the sidelink control information may include location information (e.g., location of UE 115-*a*, a zone identifier (ID) of UE 115-*a*, etc.). In some examples, the location information may include 5G NR C-V2X location information (e.g., 5G NR C-V2X zone ID). A transmitting UE's location may be indicated in sidelink control information (e.g., stage 2) associated with a PSSCH. In some examples, UE 115-*b* may determine location information for itself (e.g., zone ID of UE 115-*b*, etc.). In some examples, one or more of the UEs may be configured by the network (e.g., base station), or may be preconfigured, with zones with respect to a geographical area for each zone, and a zone identifier be associated with a current geographical area in which a UE is located. Accordingly, UE 115-*b* may estimate a distance between UE 115-*b* and UE 115-*a* based on location information of UE 115-*a* and location information of UE 115-*b*. For example, UE 115-*b* may estimate a distance between UE 115-*b* and UE 115-*a* based on UE 115-*b* determining UE 115-*b* is in zone 2 and UE 115-*a* is in zone 4, and then estimating a distance between zone 4 and zone 2.

In some examples, UE 115-*b* may estimate the Tx-Rx distance based on an absolute value of a difference between the zone of UE 115-*b* and the zone of UE 115-*a*, $\hat{d}_{Tx\text{-}Rx} = |Zone_{Tx} - Zone_{Rx}|$, where $Zone_{Rx}$ is a known location information of a receiving (Rx) UE (e.g., UE 115-*b*) (e.g., even under GNSS out-of-coverage, some sensors can also be used), and $Zone_{Tx}$ is a known location information of a transmitting (Tx) UE (e.g., UE 115-*a*). In some examples, UE 115-*b* may compensate for the packet reception time based on the following equation:

$$\hat{\tau}_c = \hat{\tau} - \frac{\hat{d}_{Tx\text{-}Rx}}{v_{light}}$$

where $v_{light}$ is the speed of light (e.g., 3×10^8 meters per second). In some examples, UE 115-*b* may adjust a slot timing by $\hat{\tau}_c$ (e.g., for adjusting a GNSS-lost NR V2X slot timing).

In some examples, UE 115-*b* may estimate a distance between UE 115-*b* and UE 115-*a* based on a received power such as received signal strength indicator (RSSI) or reference signal received power (RSRP). In some examples, UE 115-*b* may estimate a pathloss based on the received power (e.g., RSSI, RSRP, or other received signal power). In some examples, UE 115-*b* may estimate a distance between UE 115-*b* and UE 115-*a* based on the estimated pathloss. In some examples, UE 115-*b* may estimate a distance between UE 115-*b* and UE 115-*a* based on a transmission power. In some examples, UE 115-*b* may estimate a transmission power of UE 115-*a* based on a configured transmission power of UE 115-*b*, or a preconfigured transmission power.

In some examples, pathloss may be impacted detrimentally by radio channel environments (e.g., in area with multiple buildings or other objects, traveling in a car or other vehicle, interfering radio signals, etc.). In some examples, UE 115-*b* may approximate a pathloss estimation based on the radio channel environment. In some examples, UE 115-*b* may estimate a relatively coarse distance between UE 115-*b* and UE 115-*a* based on the approximated pathloss estimation.

In some examples, UE 115-*b* may compensate for frequency error (e.g., frequency drift caused by loss of synchronization source) based on one or more packet transmissions transmitted to UE 115-*b* over the physical sidelink channel 215 by UE 115-*a*. In some examples, UE 115-*b* may perform frequency error estimation based on the one or more packet transmissions. In some examples, UE 115-*b* may perform wireless wide area network (WWAN) concurrency and frequency tracking loop (FTL) usage based on the one or more packet transmissions. In some examples, UE 115-*b* may compensate for the frequency error based on the frequency error estimation, WWAN concurrency, or FTL usage, or any combination thereof.

In some examples, UE 115-*c* may experience a loss of a synchronization source. In some examples, UE 115-*c* may compensate for loss of synchronization by physical sidelink channel packet-based synchronization with UE 115-*a*. In some examples, UE 115-*c* may determine a time synchronization or a frequency synchronization, or both, based on packet transmissions from at least UE 115-*a*. In some examples, UE 115-*c* may use location information to estimate the distance between UE 115-*c* and UE 115-*a*. In some examples, UE 115-*a* may transmit sidelink control information to UE 115-*c* over physical sidelink channel 220. In some examples, UE 115-*d* may compensate for frequency error (e.g., frequency drift caused by loss of synchronization source) based on one or more packet transmissions transmitted to UE 115-*d* over the physical sidelink channel 220 by UE 115-*c*.

In some examples, UE 115-*d* may experience a loss of a synchronization source. In some examples, UE 115-*d* may compensate for loss of synchronization by physical sidelink channel packet-based synchronization with UE 115-*c*, where the synchronization of UE 115-*c* may depend the synchronization UE 115-*a*. In some examples, UE 115-*d* may determine a time synchronization or a frequency synchronization, or both, based on packet transmissions from at least UE 115-*c*. In some examples, UE 115-*d* may use location information to estimate the distance between UE 115-*d* and UE 115-*c*. In some examples, UE 115-*c* may transmit sidelink control information to UE 115-*d* over physical sidelink channel 225. In some examples, UE 115-*d* may compensate for frequency error (e.g., frequency drift caused by loss of synchronization source) based on one or more packet transmissions transmitted to UE 115-*d* over the physical sidelink channel 225 by UE 115-*c*.

In some examples, UE 115-*f* may experience a loss of a synchronization source. In some examples, UE 115-*f* may compensate for loss of synchronization by physical sidelink channel packet-based synchronization with UE 115-*e*. In some examples, UE 115-*f* may determine a time synchronization or a frequency synchronization, or both, based on packet transmissions from at least UE 115-*e*. In some examples, UE 115-*f* may use location information to estimate the distance between UE 115-*f* and UE 115-*e*. In some examples, UE 115-*e* may transmit sidelink control information to UE 115-*f* over physical sidelink channel 230. In some examples, UE 115-*f* may compensate for frequency error (e.g., frequency drift caused by loss of synchronization source) based on one or more packet transmissions transmitted to UE 115-*f* over the physical sidelink channel 230 by UE 115-*e*.

Figure 3:
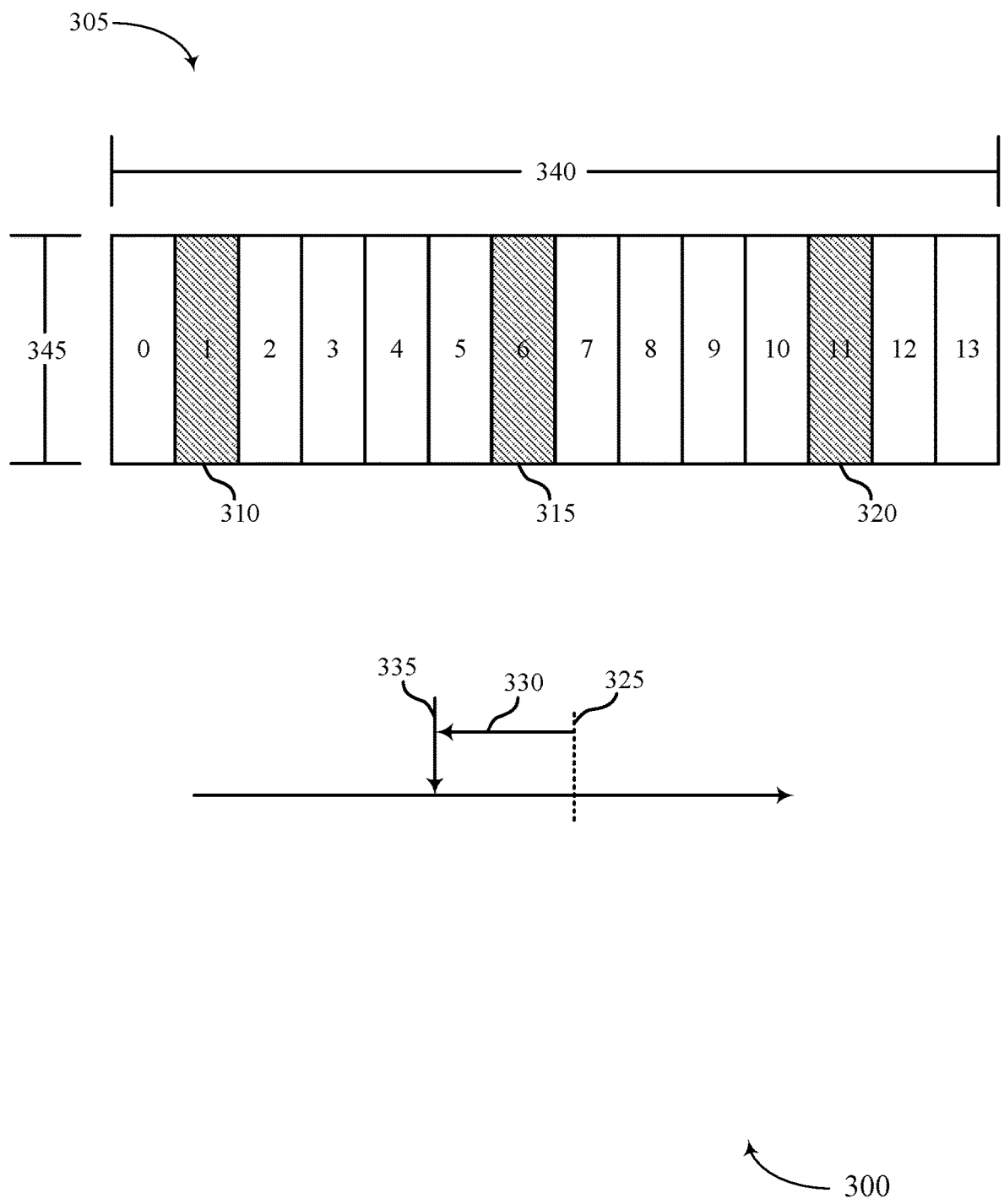
FIG. 3 illustrates an example of an environment in accordance with aspects of the present disclosure.

FIG. 3 illustrates an example of an environment 300 that supports physical sidelink channel packet-based synchronization in accordance with aspects of the present disclosure. In some examples, environment 300 may implement aspects of wireless communications system 100 or wireless communications system 200. As shown, environment 300 illustrates a physical sidelink channel transmission 305 (e.g., physical sidelink control channel (PSCCH) transmission or physical sidelink shared channel (PSSCH) transmission). In the illustrated example, physical sidelink channel transmission 305 may depict a physical sidelink channel packet transmission.

In the illustrated example, physical sidelink channel transmission 305 may include symbols of a physical sidelink channel slot 340. As shown, physical sidelink channel transmission 305 may include subchannels 345 of a physical sidelink channel, wherein subchannels 345 includes a set of subchannels or a set of physical resource blocks for the physical sidelink channel. In the illustrated example, physical sidelink channel transmission 305 may include reference signal 310, reference signal 315, and reference signal 320. At least one of reference signals 310, 315, and 320 may be an example of a demodulation reference signal.

In some examples, a synchronized device (e.g., UE 115-*a*) may transmit physical sidelink channel transmission 305. In some examples, a synchronization-lost device (e.g., UE 115-*b*) may receive physical sidelink channel transmission 305 and the synchronization-lost device may determine a time synchronization, a frequency synchronization, or both, based on the received physical sidelink channel transmission 305. In some examples, the synchronization-lost device may determine the time synchronization, the frequency synchronization, or both, based on at least one of reference signals 310, 315, and 320.

In some examples, the synchronization-lost device may perform symbol delay estimation (e.g., orthogonal frequency-division multiplexing (OFDM) symbol delay estimation). Based on its configuration, the synchronization-lost device may expect to receive a symbol of reference signal 310 at some time or location, expect to receive a symbol of reference signal 315 at some time or location, or expect to receive a symbol of reference signal 310 at some time or location, or any combination thereof. In some examples, the synchronization-lost device may determine a difference between the actual time or location of the received symbol of reference signal 310 and the expected time or location of the symbol of reference signal 310. In addition or alternatively, the synchronization-lost device may determine a similar difference for a symbol of reference signal 315 or reference signal 320, or both. In some examples, the synchronization-lost device may determine a time drift or frequency drift, or both, based on the determined difference (e.g., offset) between the actual time or location of a received symbol of a reference signal (e.g., reference signal 310, reference signal 315, or reference signal 320) and the expected time or location of the symbol of the reference signal.

In some examples, the synchronization-lost device may descramble a symbol of a reference signal (e.g., reference signal 310, reference signal 315, or reference signal 320) and extract the descrambled symbol of the reference signal in the frequency domain. In some examples, the synchronization-lost device may determine a channel impulse response based at least in part on the extracted descrambled symbol and determine a time delay estimate based at least in part on the determined channel impulse response. In some examples, the synchronization-lost device may determine a time synchronization based at least in part on a determined time delay estimate. In some examples, the synchronization-lost device may determine a time delay based at least in part on a determined first path arrival time associated with the one or more references signals.

As illustrated, the synchronization-lost device may determine a timing drift (e.g., drifted slot time 325), determine a correction factor (e.g., slot timing correction 330) to correct the timing drift, and determine delay estimation 335 based on the drifted slot time 325 and the slot timing correction 330.

In some examples, the synchronization-lost device may estimate and compensate for a timing drift based on a physical side channel packet reception (e.g., physical sidelink channel transmission 305). In some examples, the synchronization-lost device may receive a sidelink transmission (e.g., a PSSCH packet), and perform OFDM symbol delay estimation through reference signal channel estimation (e.g., DMRS channel estimation). In some examples, the synchronization-lost device may extract de-scrambled DMRS symbol in frequency domain using a fast Fourier transform (FFT), $H_j^k$, where j and k denote the $j^{th}$ Rx antenna and the $k^{th}$ reference signal orthogonal frequency-division multiplexing symbol. In some examples, the synchronization-lost device may drive a time domain channel impulse response, $h_j^k = \text{IFFT}\{H_j^k\}$, to determine the OFDM symbol delay. In some examples, the synchronization-lost device may determine the index of peak or center of mass, $\hat{\tau}=\arg\max \Sigma_j \Sigma_k |h_j^k(i)|^2$, to compensate the timing drift of the synchronization-lost device by the estimated OFDM symbol delay estimation $\hat{\tau}$. When the slot timing of the synchronization-lost device is $\tilde{\tau}$, then the corrected timing may be determined by $\tilde{\tau}+\hat{\tau}$. In some examples, OFDM symbol delay estimation may be performed in other manners. The above example considers a time domain channel impulse response and its peak index. However, there can be many other methods including frequency domain and time domain that may be used for OFDM symbol delay estimation. In addition, for the delay estimation, there can be many other methods such as first path arrival and other non-linear methods. Drifting timing correction may also be implemented using other methods. Some averaging, median, minimum, or other linear/non-linear methods, which consider multiple delay estimation, may be also used In some examples, the synchronization-lost device may receive at least one application layer message. In some examples, one or more application layer message may be received in the physical sidelink channel transmission 305. At least one of the application layer messages may include synchronization confidence information from a synchronized device (e.g., UE 115-a). In some examples, the synchronization-lost device may determine a time synchronization, a frequency synchronization, or both, based at least in part on the synchronization confidence information of the synchronized device. The synchronization confidence information may indicate a quality of a synchronization of a synchronized device or a degree to which the synchronized device is accurately synchronized. In an example, from Application-assisted information, drifting NR SL UEs can use NR SL PSSCHs from synchronized NR SL UEs.

In some examples, the synchronization-lost device may receive a first synchronization confidence information from a first synchronized device in a first transmission and receive a second synchronization confidence information from a second synchronized device (e.g., UE 115-a) in a second transmission (e.g., physical sidelink channel transmission 305). In some examples, the synchronization-lost device may determine that the second synchronization confidence information indicates the synchronization of the second synchronized device is more accurate or a higher quality than the synchronization of the first synchronized device. Accordingly, the synchronization-lost device may select to use a transmission from the second synchronized device to determine a time synchronization, a frequency synchronization, or both, based on the second synchronization confidence information being more accurate or of a higher quality than the first synchronization confidence information. In some examples, the synchronization-lost device may select to use a transmission from any synchronized device with a synchronization confidence information that satisfies or exceeds a synchronization confidence threshold, or the first synchronized device that the synchronization-lost device determines to have a synchronization confidence information that satisfies or exceeds the synchronization confidence threshold.

In some examples, the synchronization-lost device may compensate for frequency error (e.g., frequency drift of the synchronization-lost device due to the loss of synchronization, crystal oscillator drift, etc.). In some examples, a GNSS-lost UE's frequency error can keep increasing. For instance, due to crystal oscillator drift (XO) drift, NR V2X's frequency error can be increasing when there is no GNSS sync to correct the frequency error. Frequency offset may be estimated by one or more received PSCCH/PSSCH packets.

In some examples, the synchronization-lost device may determine a frequency offset to correct for the frequency error based on a reference signal of physical sidelink channel transmission 305 (e.g., reference signal 310, reference signal 315, or reference signal 320). In some examples, the synchronization-lost device may compensate for frequency error based on synchronization confidence information of a synchronized device.

In some examples, the synchronization-lost device may estimate a frequency offset by comparing a phase difference between adjacent reference signal symbols (e.g., phase difference between reference signal 310 symbol and reference signal 315 symbol, or phase difference between reference signal 315 symbol and reference signal 320 symbol, or both). In some examples, the synchronization-lost device may compare the phase difference between adjacent reference signal symbols across all antennas of the synchronization-lost device. In some examples, the synchronization-lost device may estimate a frequency offset based on the following equation:

$$\hat{f}_{fco} = \frac{\Delta f}{2\pi} \cdot \frac{N_{FFT}}{N_{FFT}+N_{CP}} \cdot \frac{1}{d_{RS\_space}} ang\left(\sum_i \sum_j (H_{j+\Delta}^i H_j^{i*})\right)$$

where $\Delta f$ is subcarrier space (e.g., sub6 30 kHz), $H_j^i$ is a de-scrambled reference signal symbol in the frequency domain, $d_{RS\_space}$ is an OFDM symbol distance between adjacent reference signal OFDM symbols, and $\Delta$ is the distance between two reference signal symbols (e.g., between two DMRS OFDM symbols). In some examples, the synchronization-lost device may perform intra-RS OFDM symbol processing to determine the frequency offset. In some examples, the frequency offset determined by the synchronization-lost device may include compensation for both Doppler and frequency error.

In some examples, an application executing on the synchronization-lost device may estimate both speed and trajectory information of devices (e.g., synchronized devices) that send messages to the synchronization-lost device. In some examples, an application may track the speed and trajectory of each received message based on message information and tracking. In some examples, even under loss of a synchronization source, some enhanced sensors may be configured to still provide the synchronization-lost device's speed. In some examples, an application may provide the Doppler impacts to a modem (e.g., a modem of the synchronization-lost device). In some examples, the modem may adjust the Doppler impacts based on the application information.

In some examples, the synchronization-lost device may determine its own speed or trajectory, or both, and determine the frequency offset based at least in part on its own determined speed (e.g., compensate for Doppler impact to modem of the synchronization-lost device). In some examples, the synchronization-lost device may receive multiple packets. In some examples, the synchronization-lost device may receive multiple frequency offset estimations based on the multiple received packets. In some examples, the synchronization-lost device may use some linear (e.g., simple average) or non-linear methods, or both, to determine a multiple frequency offset estimation.

In some examples, the synchronization-lost device may receive packets from multiple synchronized devices (e.g., UE 115-a and one or more additional UE devices, etc.). In some examples, the synchronization-lost device may determine a frequency offset for each of the multiple synchronized devices. In some examples, the synchronization-lost device may determine an overall frequency offset based on each of the multiple determined frequency offsets. In some examples, the synchronization-lost device may receive a zone identifier in each packet received from at least two of the multiple synchronized devices. In some examples, the synchronization-lost device may determine a propagation delay based on location information associated with the zone identifiers. In some examples, the synchronization-lost device may determine a propagation delay compensation based on the multiple zone identifiers received in the multiple packets. In some examples, linear (e.g., average) or non-linear methods, or both, may be used to determine a propagation delay compensation. In some examples, the synchronization-lost device may determine a propagation delay compensation based on the zone identifiers, the linear methods, or the non-linear methods, or any combination thereof.

In some examples, the synchronization-lost device may receive safety messages in applications (e.g., V2X safety messages received in applications executing on the synchronization-lost device). In some examples, a received safety message may include location information. In some examples, the application (e.g., V2X application) may receive a safety message and estimate a propagation delay based on the location information included in the safety message and the known location of the synchronization-lost device.

In some examples, the synchronization-lost device may receive an indication of a received Rx power (e.g., received signal strength indicator (RSSI) or reference signal received power (RSRP)) from a synchronized device (e.g., in a received Rx power measurement report). In some examples, the synchronization-lost device may estimate pathloss based on the received Rx power. In some examples, the synchronization-lost device may know its own configured transmission Tx power. In some examples, the synchronization-lost device may estimate pathloss based on the its own configured transmission Tx power. In some examples, pathloss may be impacted detrimentally by radio channel environments (e.g., synchronization-lost device is in area with multiple buildings or other objects, is traveling in a car or other vehicle or is a vehicle that is traveling, other radio signals interfere with a transmission from a synchronized device, etc.). In some examples, the synchronization-lost device may approximate a pathloss estimation based on the radio channel environment. In some examples, the synchronization-lost device may estimate a relatively coarse distance between the synchronization-lost device and a synchronized device based on the approximated pathloss estimation.

In some examples, the synchronization-lost device may track frequency error associated with a wireless network connection (e.g., wireless wide area network (WWAN). In some examples, the synchronization-lost device may track the frequency error through frequency tracking loop (FTL). In some examples, the synchronization-lost device may compensate for a frequency error in a first network (e.g., vehicle to everything (V2X) network) based on the tracked frequency error of the wireless network connection. In some examples, the synchronization-lost device may use a unit conversion to convert the frequency error of the wireless network to the first network. In one example, (frequency error of the first network)=(wireless network frequency error)×(unit conversion), where the unit conversion is a predetermined value.

Figure 4:
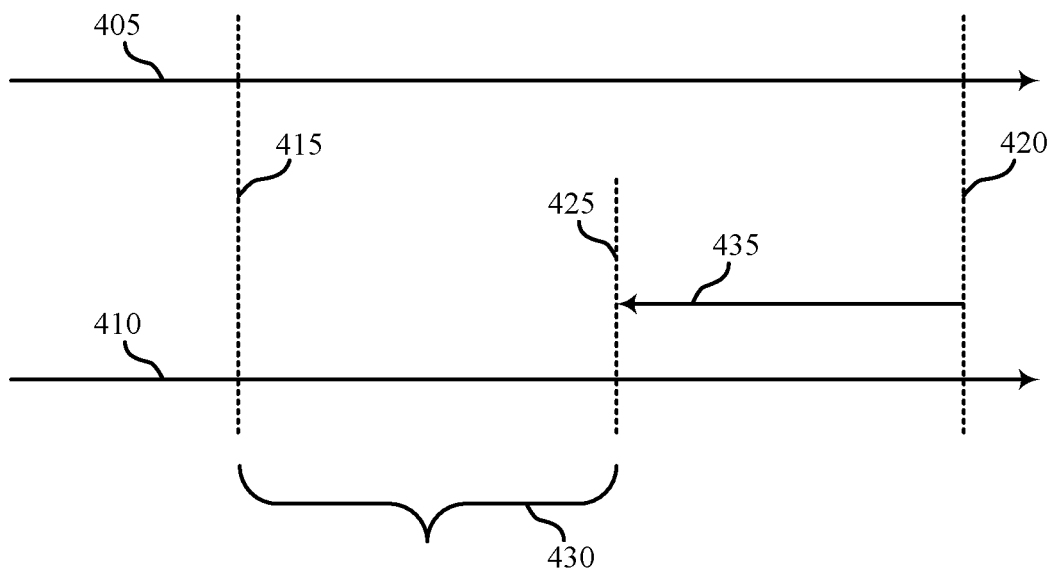
FIG. 4 illustrates an example of a timing diagram in accordance with aspects of the present disclosure.

FIG. 4 illustrates an example of a timing diagram 400 that supports physical sidelink channel packet-based synchronization in accordance with aspects of the present disclosure. In some examples, timing diagram 400 may implement aspects of wireless communications system 100. In some cases, packet reception time is impacted by propagation time delay. For example, under free space condition, a Tx-Rx distance of 300 meters can cause 1 microsecond of propagation delay, which may impact how slot timing is determined (e.g., GNSS-synced NR V2X slot timing).

In some examples, timing diagram 400 may depict a timeline 405 of a synchronized device (e.g., UE 115-a) and a timeline 410 of a synchronization-lost device (e.g., UE 115-b). At 415 the synchronized device may transmit a packet via a physical sidelink channel (e.g., physical sidelink channel transmission 305). The drifted slot timing of the synchronization-lost device may be represented at 420.

In the illustrated example, the synchronization-lost device may receive the packet at 425. As shown, propagation delay 430 may indicate a time delay between the synchronized device transmitting the packet at 415 and the synchronization-lost device receiving the packet at 425. As depicted, the drifted slot timing 420 of the synchronization-lost device may be determined by the synchronization-lost device. Accordingly, the synchronization-lost device may determine the slot timing adjustment 435 based on the packet arriving at 425 and the drifted slot timing 420.

Figure 5:
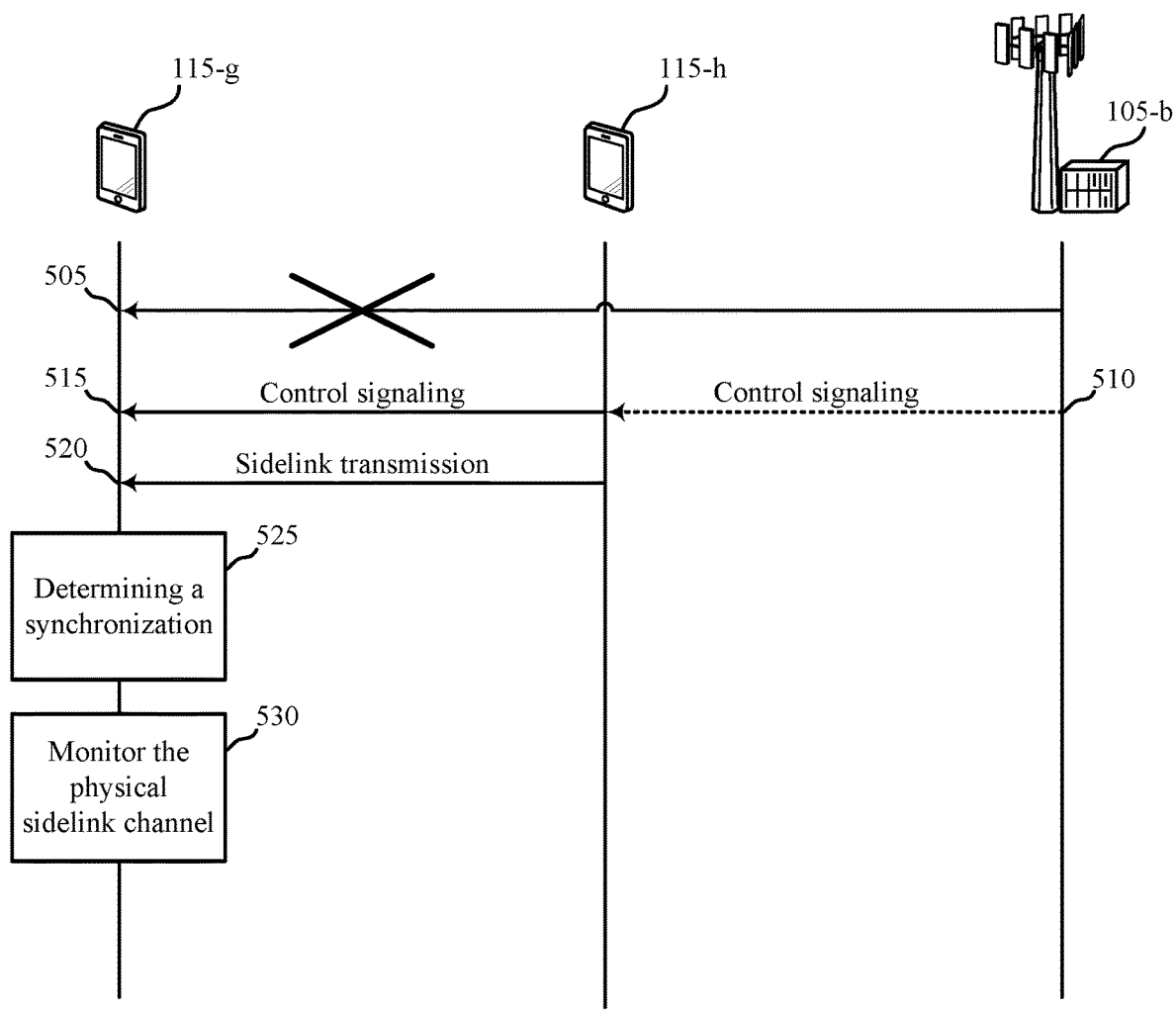
FIG. 5 illustrates an example of a process in accordance with aspects of the present disclosure.

FIG. 5 illustrates an example of a process 500 that supports physical sidelink channel packet-based synchronization in accordance with aspects of the present disclosure. In some examples, process 500 may implement aspects of wireless communications system 100. As illustrated, process 500 may include UE 115-g, UE 115-h, and base station 105-b, which may be examples of a UE 115 or a base station 105, as described herein with reference to FIG. 1.

At 505, UE 115-g may lose synchronization with base station 105-b. At 505, UE 115-g may determine that it has lost a synchronization source.

At 510, base station 105-b may optionally transmit control signaling to UE 115-h. In some examples, UE 115-h may maintain communication with a synchronization source (e.g., base station 105-b, or a satellite connection, or both).

At 515, UE 115-h may transmit control signaling to UE 115-g. In some examples, the control signaling of 515 may schedule a sidelink transmission via a physical sidelink channel.

At 520, UE 115-h may transmit a sidelink transmission to UE 115-g via the physical sidelink channel. In some examples, the sidelink transmission of 520 may include one or more reference signals based on the control signaling.

At 525, UE 115-g may determine the time synchronization, frequency synchronization, or both, based on the one or more reference signals from the sidelink transmission of 520.

At 530, UE 115-g may monitor the physical sidelink channel based on the time synchronization, the frequency synchronization, or both. In some examples, UE 115-g may maintain the time synchronization, the frequency synchronization, or both, based on the monitoring of the physical sidelink channel.

Figure 6:
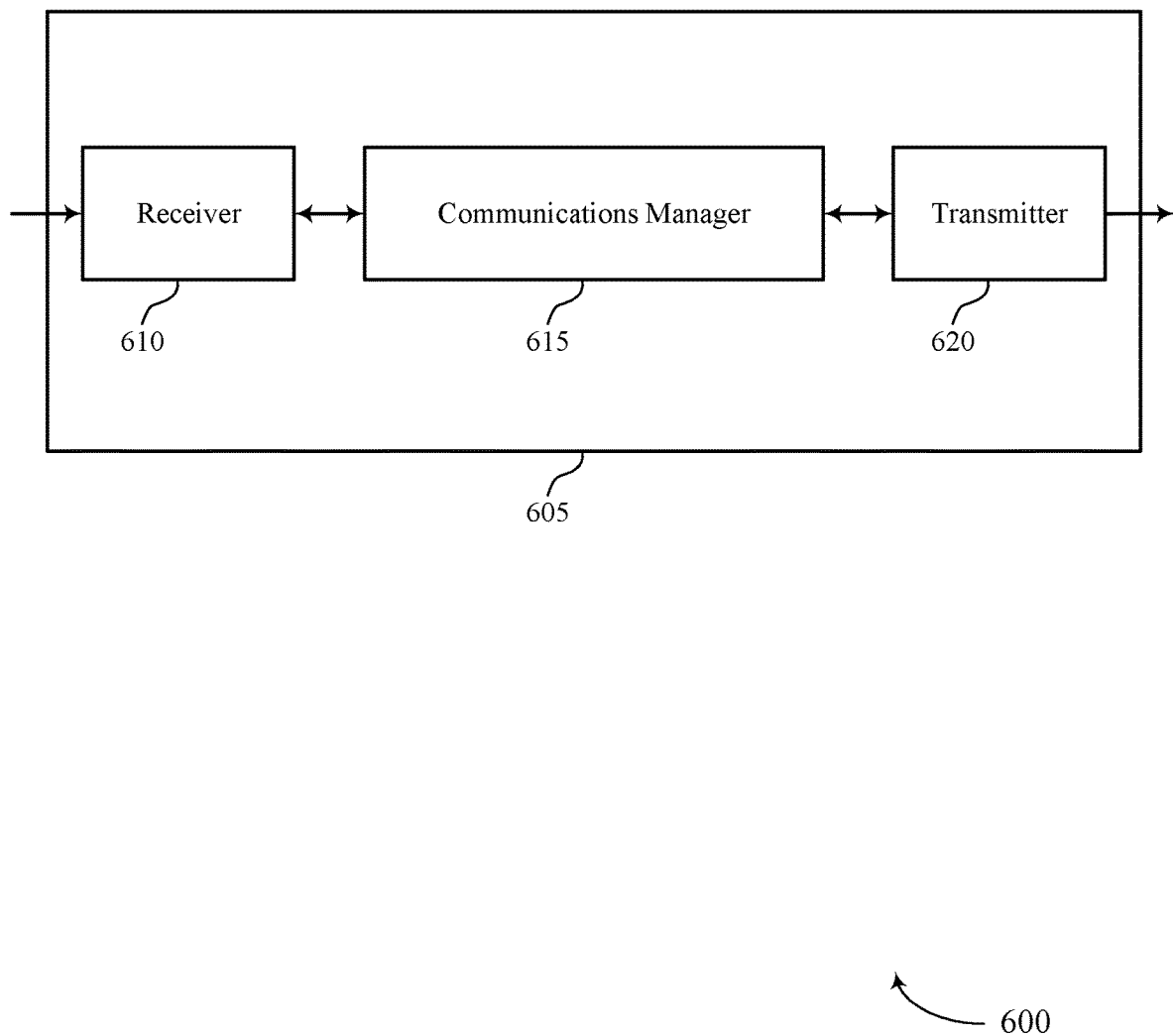
FIGS. 6 and 7 show block diagrams of devices in accordance with aspects of the present disclosure.

FIG. 6 shows a block diagram 600 of a device 605 that supports physical sidelink channel packet-based synchronization in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to physical sidelink channel packet-based synchronization, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may communicate control signaling scheduling a sidelink transmission via a physical sidelink channel, receive, by a first UE, the sidelink transmission including one or more reference signals from a second UE via the physical sidelink channel (e.g., based on the control signaling, based on data signaling, etc.), and monitor the physical sidelink channel based on time synchronization, frequency synchronization, or both, determined using the one or more reference signals. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
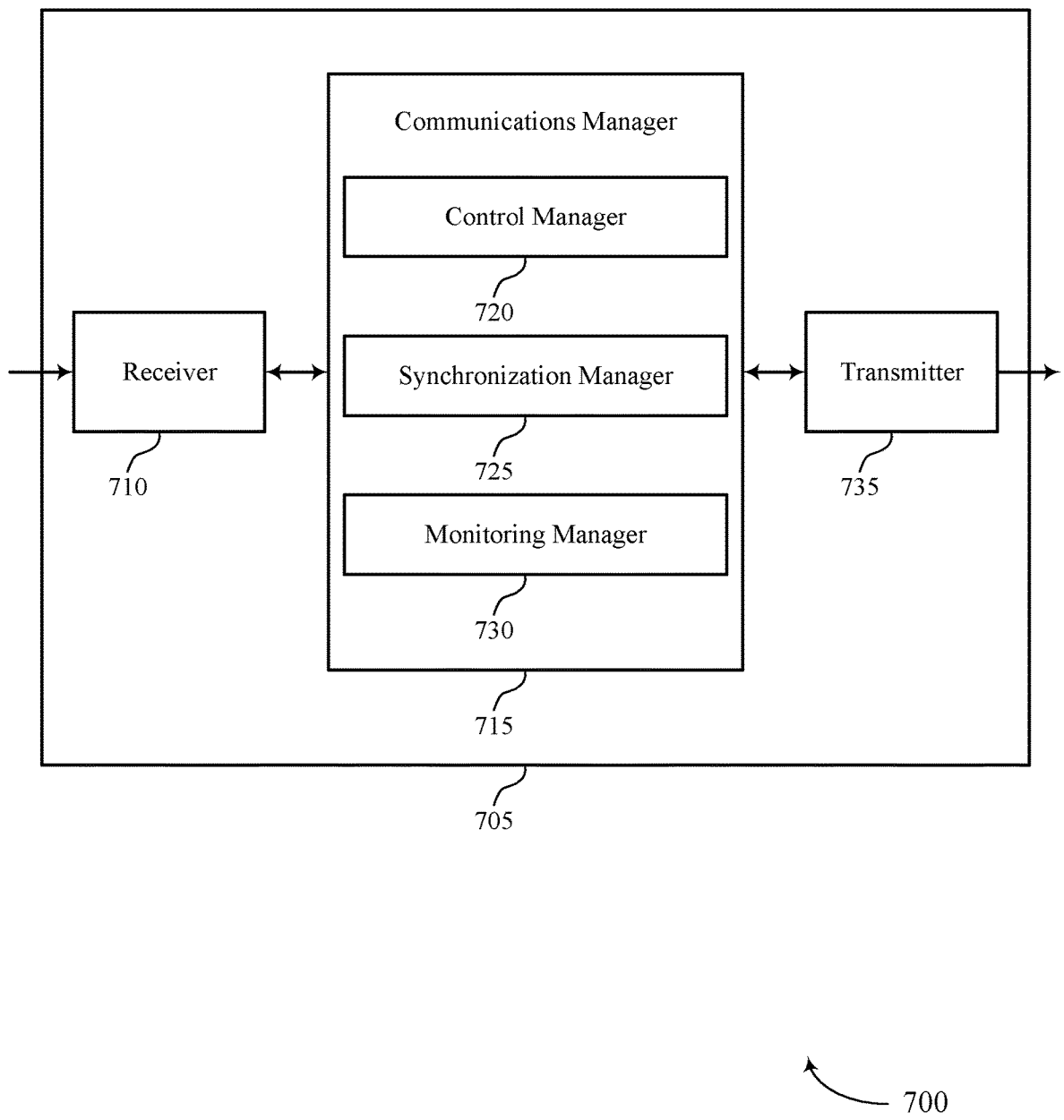

FIG. 7 shows a block diagram 700 of a device 705 that supports physical sidelink channel packet-based synchronization in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to physical sidelink channel packet-based synchronization, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a control manager 720, a synchronization manager 725, and a monitoring manager 730. The communications manager 715 may be an example of aspects of the communications manager 910 described herein.

The control manager 720 may communicate control signaling scheduling a sidelink transmission via a physical sidelink channel. The synchronization manager 725 may receive, by a first UE, the sidelink transmission including one or more reference signals from a second UE via the physical sidelink channel (e.g., based on the control signaling, based on data signaling, etc.). The monitoring manager 730 may monitor the physical sidelink channel based on time synchronization, frequency synchronization, or both, determined using the one or more reference signals.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
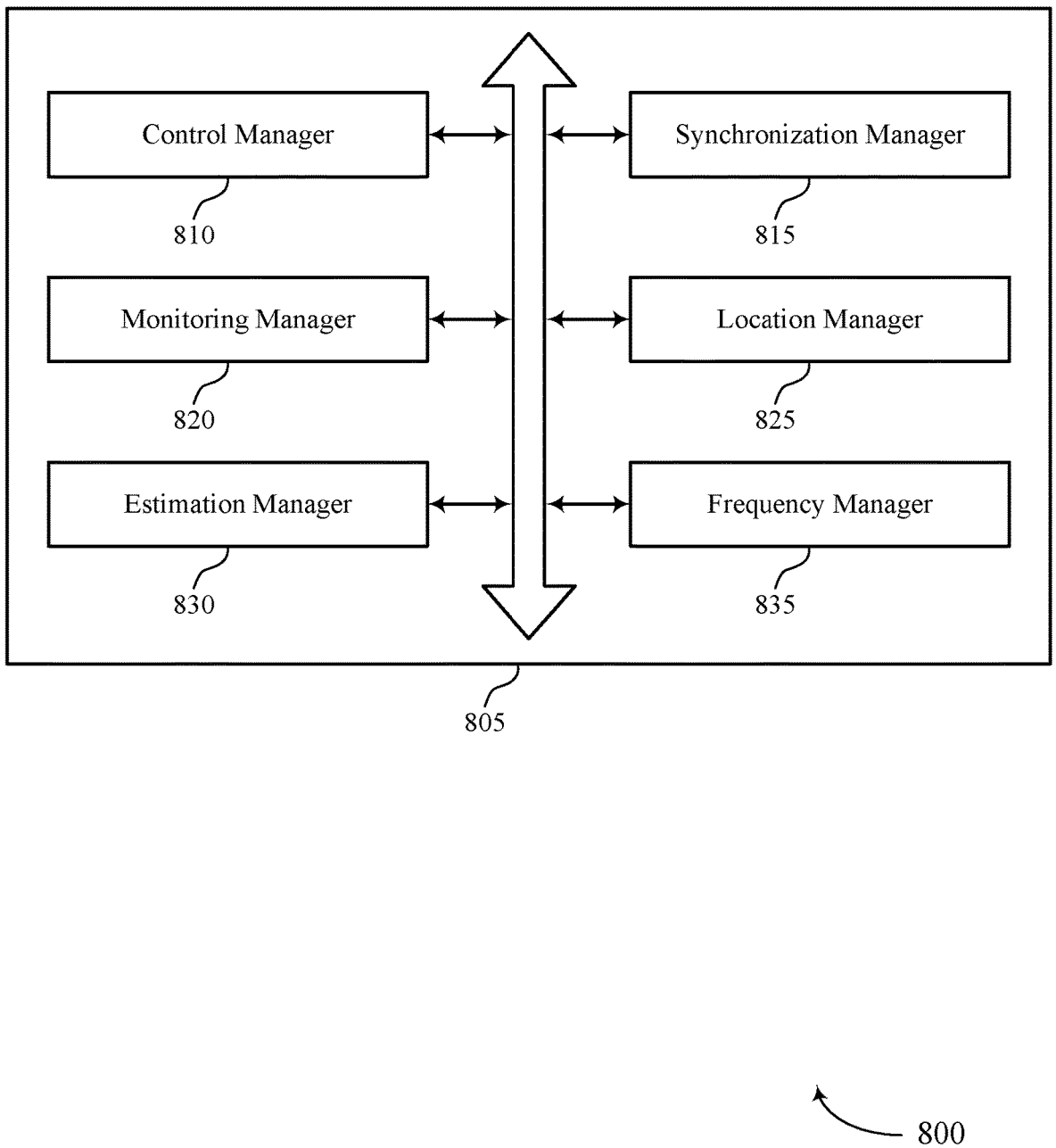
FIG. 8 shows a block diagram of a communications manager in accordance with aspects of the present disclosure.

FIG. 8 shows a block diagram 800 of a communications manager 805 that supports physical sidelink channel packet-based synchronization in accordance with aspects of the present disclosure. The communications manager 805 may be an example of aspects of a communications manager 615, a communications manager 715, or a communications manager 910 described herein. The communications manager 805 may include a control manager 810, a synchronization manager 815, a monitoring manager 820, a location manager 825, an estimation manager 830, and a frequency manager 835. Each of these modules may communicate, directly or indirectly, with one another (e.g., via one or more buses).

The control manager 810 may communicate control signaling scheduling a sidelink transmission via a physical sidelink channel. In some examples, the control manager 810 may receive, based on the control signaling, the one or more reference signals in one or more reference signal symbol periods allocated within a resource of the physical sidelink channel for the sidelink transmission. In some cases, the physical sidelink channel includes a physical sidelink control channel or a physical sidelink shared channel. In some cases, the one or more reference signals include at least one demodulation reference signal (DMRS).

The synchronization manager 815 may receive, by a first UE, the sidelink transmission including one or more reference signals from a second UE via the physical sidelink channel (e.g., based on the control signaling, based on data signaling, etc.). In some examples, the synchronization manager 815 may receive synchronization confidence information from the second UE, where the time synchronization is determined using the one or more reference signals based on a synchronization confidence level satisfying a confidence threshold.

In some examples, the synchronization manager 815 may receive the synchronization confidence information in an application layer message from the second UE. In some examples, the synchronization manager 815 may receive, by the first UE, a second sidelink transmission including one or more reference signals from a third UE. In some examples, the synchronization manager 815 may receive second synchronization confidence information from a third UE, where the time synchronization is determined without using the one or more reference signals of the second sidelink transmission based on a second synchronization confidence level not satisfying a confidence threshold.

In some examples, the synchronization manager 815 may determine, by the first UE, a loss of synchronization with a synchronization source, where the time synchronization, the frequency synchronization, or both, are determined using the one or more reference signals of the sidelink transmission based on the loss of synchronization. In some examples, the synchronization manager 815 may determine the time synchronization based on. In some examples, the synchronization manager 815 may descramble a symbol of a first reference signal of the one or more reference signals. In some examples, the synchronization manager 815 may extract the descrambled symbol of the first reference signal in frequency domain. In some examples, the synchronization manager 815 may determine a channel impulse response based on the extracted descrambled symbol. In some examples, the synchronization manager 815 may determine a time delay estimate based on the determined channel impulse response.

The monitoring manager 820 may monitor the physical sidelink channel based on time synchronization, frequency synchronization, or both, determined using the one or more reference signals.

The location manager 825 may receive location information of the second UE, where the time synchronization is determined based on the location information. In some examples, the location manager 825 may receive location information from a set of UEs including the second UE, where the time synchronization is determined based on the location information for the set of UEs.

The estimation manager 830 may estimate a distance between the second UE and the first UE based on the location information, where the time synchronization is determined based on the estimated distance. In some examples, the estimation manager 830 may receive a safety message including the location information. In some examples, the estimation manager 830 may estimate a statistical distance metric (e.g., average distance, mean distance, median distance, etc.) based on the location information for the set of UEs, where the time synchronization is determined based on the statistical distance metric.

In some examples, the estimation manager 830 may estimate a distance between the second UE and the first UE based on a transmission power associated with the sidelink transmission, where the time synchronization is determined based on the estimated distance. In some examples, the estimation manager 830 may estimate a pathloss based on the sidelink transmission. In some examples, the estimation manager 830 may estimate a distance between the first UE and the second UE based on the estimated pathloss, where the time synchronization is determined based on the estimated distance.

In some examples, the estimation manager 830 may determine a received signal strength associated with the sidelink transmission. In some examples, the estimation manager 830 may estimate the pathloss based on the determined received signal strength. In some examples, the estimation manager 830 may estimate a timing drift based on the one or more reference signals, where the time synchronization is determined based on the estimated timing drift.

In some cases, the location information includes a zone identification of the second UE. In some cases, the received signal strength includes a received signal strength indicator (RSSI), a reference signal received power (RSRP) associated with the sidelink transmission, or both.

The frequency manager 835 may estimate a frequency offset based on the one or more reference signals, where the frequency synchronization is determined based on the estimated frequency offset. In some examples, the frequency manager 835 may receive a set of sidelink transmissions from a set of UEs including the second UE. In some examples, the frequency manager 835 may determine a set of frequency offsets, where each frequency offset is determined for a respective sidelink transmission of the set of sidelink transmissions, and where the frequency synchronization is determined based on the set of frequency offsets.

Figure 9:
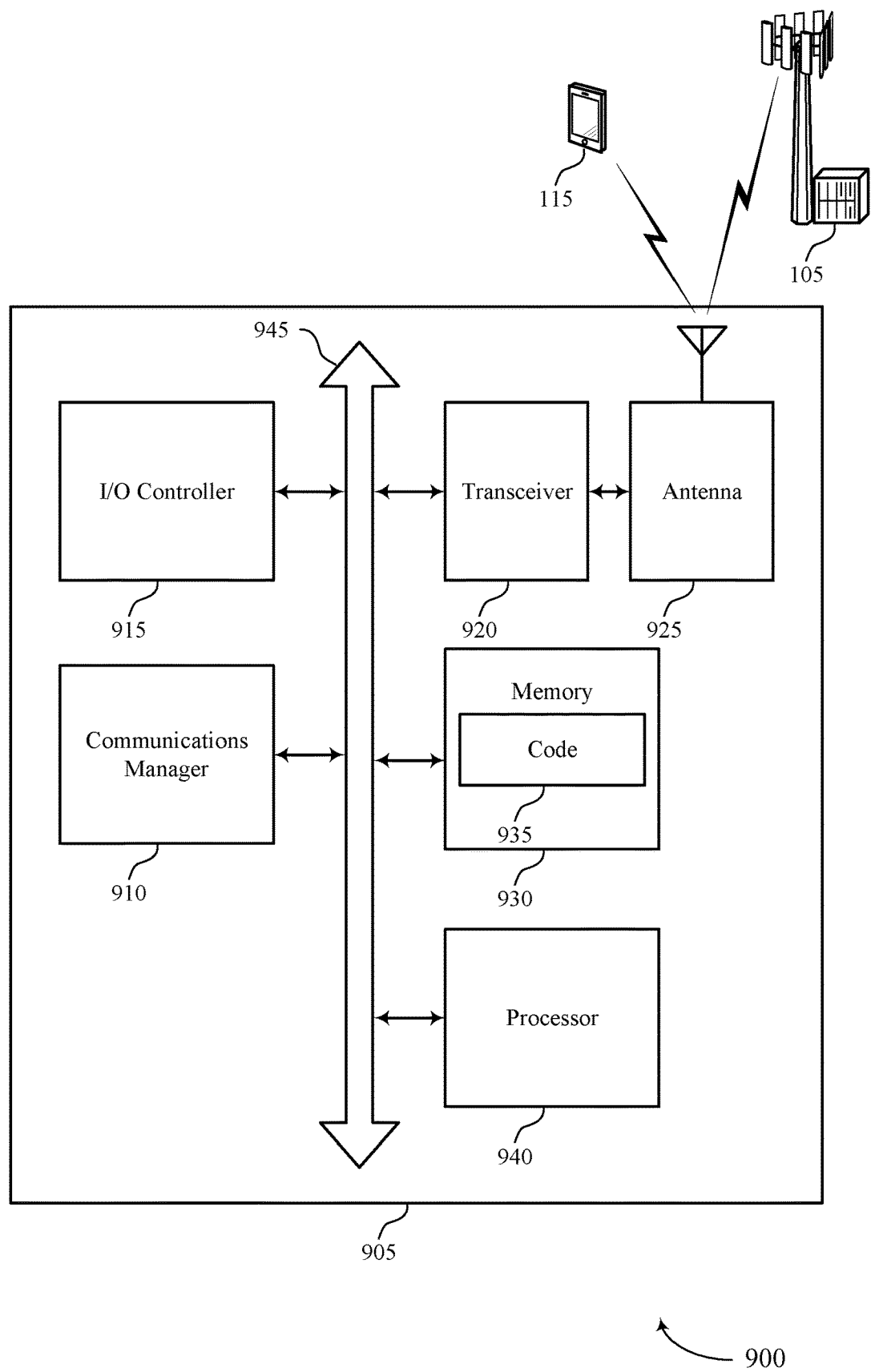
FIG. 9 shows a diagram of a system including a device in accordance with aspects of the present disclosure.

FIG. 9 shows a diagram of a system 900 including a device 905 that supports physical sidelink channel packet-based synchronization in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may communicate control signaling scheduling a sidelink transmission via a physical sidelink channel, receive, by a first UE, the sidelink transmission including one or more reference signals from a second UE via the physical sidelink channel (e.g., based on the control signaling, based on data signaling, etc.), and monitor the physical sidelink channel based on time synchronization, frequency synchronization, or both, determined using the one or more reference signals.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting physical sidelink channel packet-based synchronization).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
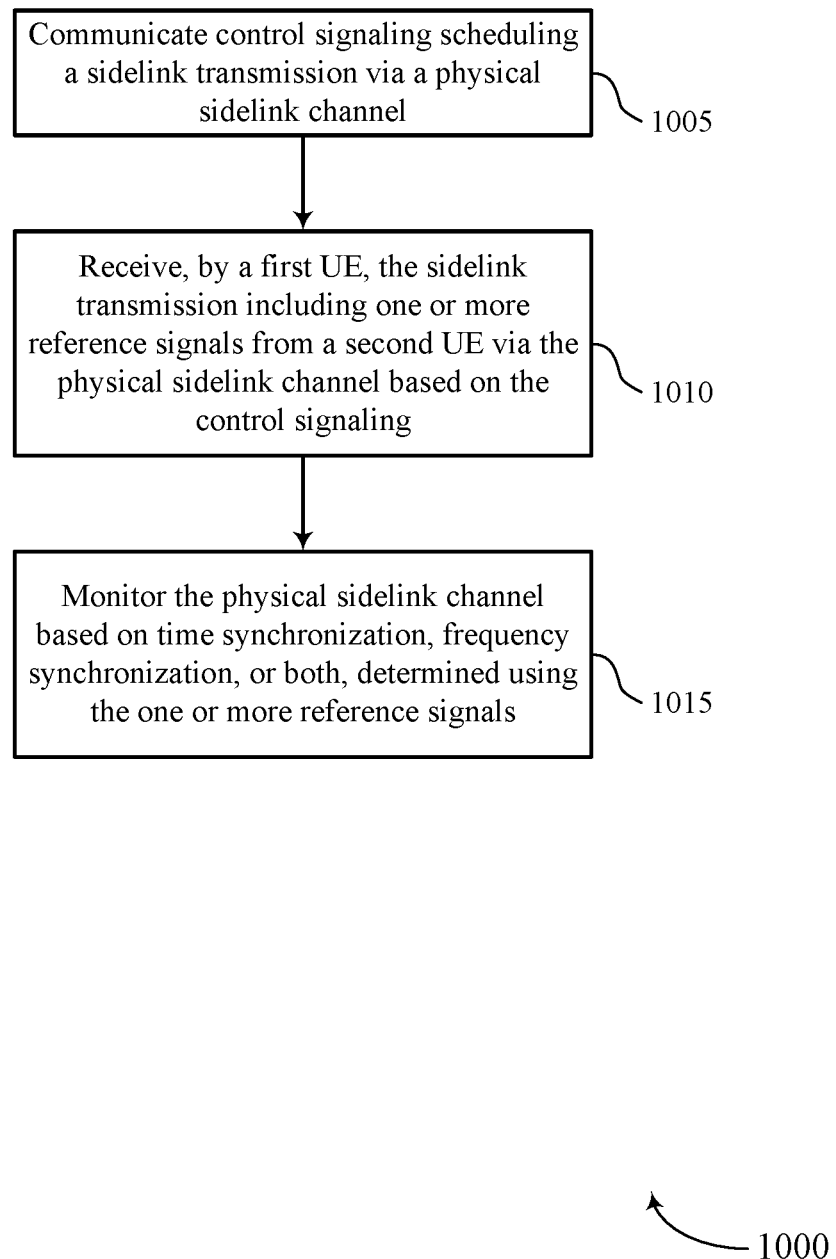
FIGS. 10 and 11 show flowcharts illustrating methods in accordance with aspects of the present disclosure.

FIG. 10 shows a flowchart illustrating a method 1000 that supports physical sidelink channel packet-based synchronization in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may communicate control signaling scheduling a sidelink transmission via a physical sidelink channel. The operations of 1005 may be performed according to the methods described herein. In some examples, aspects of the operations of 1005 may be performed by a control manager as described with reference to FIGS. 6 through 9.

At 1010, the UE may receive, by a first UE, the sidelink transmission including one or more reference signals from a second UE via the physical sidelink channel (e.g., based on the control signaling, based on data signaling, etc.). The operations of 1010 may be performed according to the methods described herein. In some examples, aspects of the operations of 1010 may be performed by a synchronization manager as described with reference to FIGS. 6 through 9.

At 1015, the UE may monitor the physical sidelink channel based on time synchronization, frequency synchronization, or both, determined using the one or more reference signals. The operations of 1015 may be performed according to the methods described herein. In some examples, aspects of the operations of 1015 may be performed by a monitoring manager as described with reference to FIGS. 6 through 9.

Figure 11:
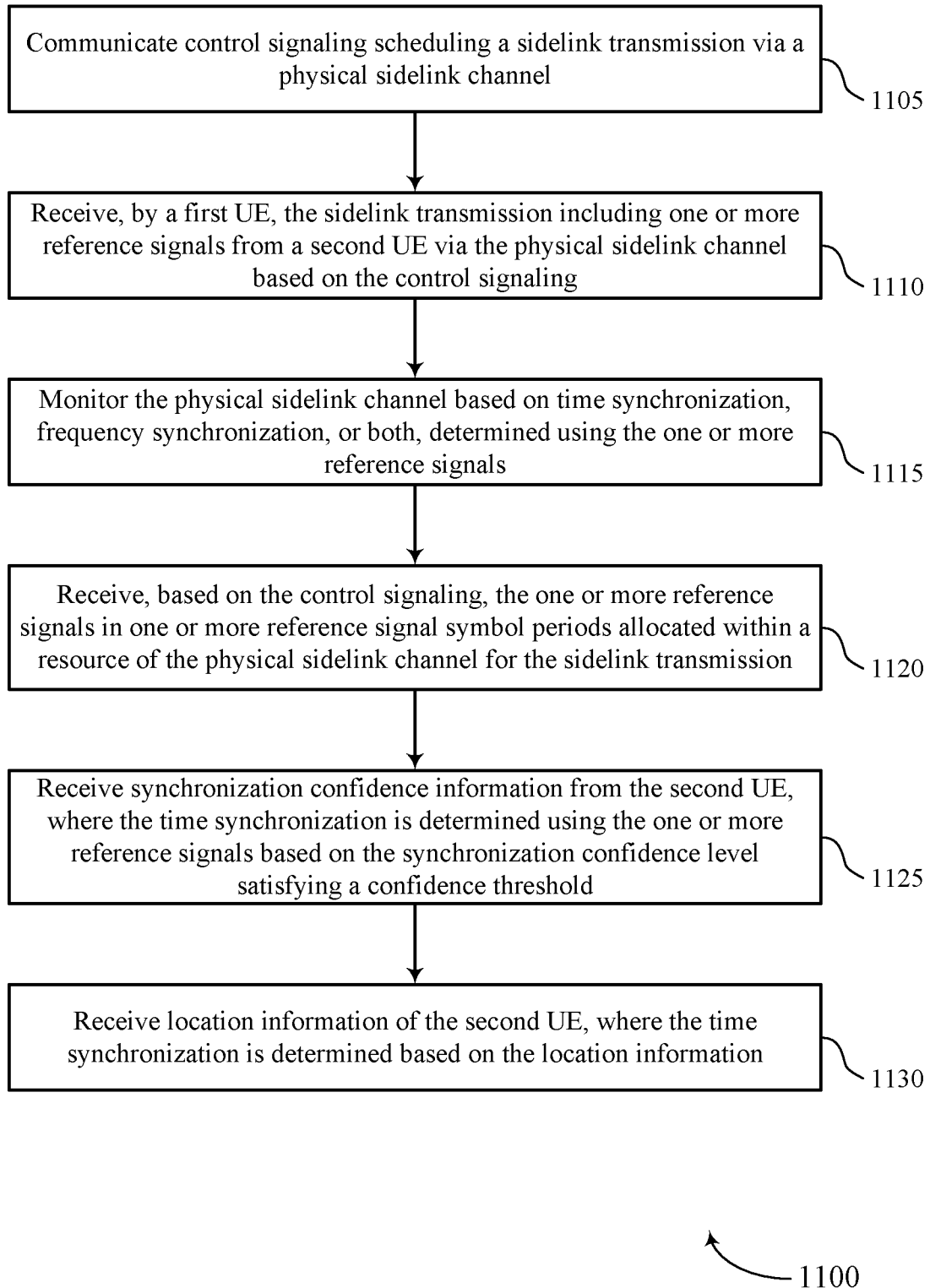

FIG. 11 shows a flowchart illustrating a method 1100 that supports physical sidelink channel packet-based synchronization in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may communicate control signaling scheduling a sidelink transmission via a physical sidelink channel. The operations of 1105 may be performed according to the methods described herein. In some examples, aspects of the operations of 1105 may be performed by a control manager as described with reference to FIGS. 6 through 9.

At 1110, the UE may receive, by a first UE, the sidelink transmission including one or more reference signals from a second UE via the physical sidelink channel (e.g., based on the control signaling, based on data signaling, etc.). The operations of 1110 may be performed according to the methods described herein. In some examples, aspects of the operations of 1110 may be performed by a synchronization manager as described with reference to FIGS. 6 through 9.

At 1115, the UE may monitor the physical sidelink channel based on time synchronization, frequency synchronization, or both, determined using the one or more reference signals. The operations of 1115 may be performed according to the methods described herein. In some examples, aspects of the operations of 1115 may be performed by a monitoring manager as described with reference to FIGS. 6 through 9.

At 1120, the UE may receive, based on the control signaling, the one or more reference signals in one or more reference signal symbol periods allocated within a resource of the physical sidelink channel for the sidelink transmission. The operations of 1120 may be performed according to the methods described herein. In some examples, aspects of the operations of 1120 may be performed by a control manager as described with reference to FIGS. 6 through 9.

At 1125, the UE may receive synchronization confidence information from the second UE, where the time synchronization is determined using the one or more reference signals based on the synchronization confidence level satisfying a confidence threshold. The operations of 1125 may be performed according to the methods described herein. In some examples, aspects of the operations of 1125 may be performed by a synchronization manager as described with reference to FIGS. 6 through 9.

At 1130, the UE may receive location information of the second UE, where the time synchronization is determined based on the location information. The operations of 1130 may be performed according to the methods described herein. In some examples, aspects of the operations of 1130 may be performed by a location manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: communicating control signaling scheduling a sidelink transmission via a physical sidelink channel; receiving, by a first UE, the sidelink transmission comprising one or more reference signals from a second UE via the physical sidelink channel; and monitoring the physical sidelink channel based at least in part on time synchronization, frequency synchronization, or both, determined using the one or more reference signals.

Aspect 2: The method of aspect 1, wherein receiving the sidelink transmission comprises: receiving the one or more reference signals in one or more reference signal symbol periods allocated within a resource of the physical sidelink channel for the sidelink transmission.

Aspect 3: The method of any of aspects 1 through 2, further comprising: receiving synchronization confidence information from the second UE, wherein the time synchronization is determined using the one or more reference signals based at least in part on a synchronization confidence level satisfying a confidence threshold.

Aspect 4: The method of aspect 3, wherein receiving the synchronization confidence information comprises: receiving the synchronization confidence information in an application layer message from the second UE.

Aspect 5: The method of any of aspects 3 through 4, further comprising: receiving, by the first UE, a second sidelink transmission comprising one or more reference signals from a third UE; and receiving second synchronization confidence information from the third UE, wherein the time synchronization is determined without using the one or more reference signals of the second sidelink transmission based at least in part on a second synchronization confidence level not satisfying the confidence threshold.

Aspect 6: The method of any of aspects 1 through 5, further comprising: receiving location information of the second UE, wherein the time synchronization is determined based at least in part on the location information.

Aspect 7: The method of aspect 6, further comprising: estimating a distance between the second UE and the first UE based at least in part on the location information, wherein the time synchronization is determined based at least in part on the estimated distance.

Aspect 8: The method of any of aspects 6 through 7, wherein the location information comprises a zone identification of the second UE.

Aspect 9: The method of any of aspects 6 through 8, wherein receiving the location information comprises: receiving a safety message comprising the location information.

Aspect 10: The method of any of aspects 1 through 9, further comprising: receiving location information from a plurality of UEs including the second UE, wherein the time synchronization is determined based at least in part on the location information for the plurality of UEs.

Aspect 11: The method of aspect 10, further comprising: estimating a statistical distance metric based at least in part on the location information for the plurality of UEs, wherein the time synchronization is determined based at least in part on the statistical distance metric.

Aspect 12: The method of any of aspects 1 through 11, further comprising: estimating a frequency offset based at least in part on the one or more reference signals, wherein the frequency synchronization is determined based at least in part on the estimated frequency offset.

Aspect 13: The method of any of aspects 1 through 12, further comprising: receiving a plurality of sidelink transmissions from a plurality of UEs including the second UE; and determining a plurality of frequency offsets, wherein each frequency offset is determined for a respective sidelink transmission of the plurality of sidelink transmissions, and wherein the frequency synchronization is determined based at least in part on the plurality of frequency offsets.

Aspect 14: The method of any of aspects 1 through 13, further comprising: estimating a distance between the second UE and the first UE based at least in part on a transmission power associated with the sidelink transmission, wherein the time synchronization is determined based at least in part on the estimated distance.

Aspect 15: The method of any of aspects 1 through 14, further comprising: estimating a pathloss based at least in part on the sidelink transmission.

Aspect 16: The method of aspect 15, further comprising: estimating a distance between the first UE and the second UE based at least in part on the estimated pathloss, wherein the time synchronization is determined based at least in part on the estimated distance.

Aspect 17: The method of any of aspects 15 through 16, further comprising: determining a received signal strength associated with the sidelink transmission; and estimating the pathloss based at least in part on the determined received signal strength.

Aspect 18: The method of aspect 17, wherein the received signal strength comprises a received signal strength indicator (RSSI), a reference signal received power (RSRP) associated with the sidelink transmission, or both.

Aspect 19: The method of any of aspects 1 through 18, further comprising: determining, by the first UE, a loss of synchronization with a synchronization source, wherein the time synchronization, the frequency synchronization, or both, are determined using the one or more reference signals of the sidelink transmission based at least in part on the loss of synchronization.

Aspect 20: The method of any of aspects 1 through 19, further comprising: determining the time synchronization based at least in part on: descrambling a symbol of a first reference signal of the one or more reference signals; extracting the descrambled symbol of the first reference signal in frequency domain; determining a channel impulse response based at least in part on the extracted descrambled symbol; and determining a time delay estimate based at least in part on the determined channel impulse response.

Aspect 21: The method of any of aspects 1 through 20, further comprising: estimating a timing drift based at least in part on the one or more reference signals, wherein the time synchronization is determined based at least in part on the estimated timing drift.

Aspect 22: The method of any of aspects 1 through 21, wherein the physical sidelink channel comprises a physical sidelink control channel or a physical sidelink shared channel.

Aspect 23: The method of any of aspects 1 through 22, wherein the one or more reference signals include at least one DMRS.

Aspect 24: An apparatus for wireless communication, comprising a processor; memory coupled with the processor; and instructions stored in the memory and executable by the processor to cause the apparatus to perform a method of any of aspects 1 through 23.

Aspect 25: An apparatus for wireless communication, comprising at least one means for performing a method of any of aspects 1 through 23.

Aspect 26: A non-transitory computer-readable medium storing code for wireless communication, the code comprising instructions executable by a processor to perform a method of any of aspects 1 through 23.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
communicating control signaling scheduling a sidelink transmission via a physical sidelink channel;
receiving, by a first user equipment (UE), the sidelink transmission comprising one or more reference signals from a second UE via the physical sidelink channel;
monitoring the physical sidelink channel based at least in part on time synchronization, frequency synchronization, or both, determined using the one or more reference signals; and
receiving location information of the second UE, wherein the time synchronization is determined based at least in part on the location information.

2. The method of claim 1, wherein receiving the sidelink transmission comprises:
receiving the one or more reference signals in one or more reference signal symbol periods allocated within a resource of the physical sidelink channel for the sidelink transmission.

3. The method of claim 1, further comprising:
receiving synchronization confidence information from the second UE, wherein the time synchronization is determined using the one or more reference signals based at least in part on a synchronization confidence level satisfying a confidence threshold.

4. The method of claim 3, wherein receiving the synchronization confidence information comprises:
receiving the synchronization confidence information in an application layer message from the second UE.

5. The method of claim 3, further comprising:
receiving, by the first UE, a second sidelink transmission comprising one or more reference signals from a third UE; and
receiving second synchronization confidence information from the third UE, wherein the time synchronization is determined without using the one or more reference signals of the second sidelink transmission based at least in part on a second synchronization confidence level not satisfying the confidence threshold.

6. The method of claim 1, further comprising:
estimating a distance between the second UE and the first UE based at least in part on the location information, wherein the time synchronization is determined based at least in part on the estimated distance.

7. The method of claim 1, wherein the location information comprises a zone identification of the second UE.

8. The method of claim 1, wherein receiving the location information comprises:
receiving a safety message comprising the location information.

9. The method of claim 1, further comprising:
receiving location information from a plurality of UEs including the second UE, wherein the time synchronization is determined based at least in part on the location information for the plurality of UEs.

10. The method of claim 9, further comprising:
estimating a statistical distance metric based at least in part on the location information for the plurality of UEs, wherein the time synchronization is determined based at least in part on the statistical distance metric.

11. The method of claim 1, further comprising:
estimating a frequency offset based at least in part on the one or more reference signals, wherein the frequency synchronization is determined based at least in part on the estimated frequency offset.

12. The method of claim 1, further comprising:
receiving a plurality of sidelink transmissions from a plurality of UEs including the second UE; and
determining a plurality of frequency offsets, wherein each frequency offset is determined for a respective sidelink transmission of the plurality of sidelink transmissions, and wherein the frequency synchronization is determined based at least in part on the plurality of frequency offsets.

13. The method of claim 1, further comprising:
estimating a distance between the second UE and the first UE based at least in part on a transmission power associated with the sidelink transmission, wherein the time synchronization is determined based at least in part on the estimated distance.

14. The method of claim 1, further comprising:
estimating a pathloss based at least in part on the sidelink transmission.

15. The method of claim 14, further comprising:
estimating a distance between the first UE and the second UE based at least in part on the estimated pathloss, wherein the time synchronization is determined based at least in part on the estimated distance.

16. The method of claim 14, further comprising:
determining a received signal strength associated with the sidelink transmission; and
estimating the pathloss based at least in part on the determined received signal strength.

17. The method of claim 16, wherein the received signal strength comprises a received signal strength indicator (RSSI), a reference signal received power (RSRP) associated with the sidelink transmission, or both.

18. The method of claim 1, further comprising:
determining, by the first UE, a loss of synchronization with a synchronization source, wherein the time synchronization, the frequency synchronization, or both, are determined using the one or more reference signals of the sidelink transmission based at least in part on the loss of synchronization.

19. The method of claim 1, further comprising:
determining the time synchronization based at least in part on;
descrambling a symbol of a first reference signal of the one or more reference signals;
extracting the descrambled symbol of the first reference signal in frequency domain;
determining a channel impulse response based at least in part on the extracted descrambled symbol; and
determining a time delay estimate based at least in part on the determined channel impulse response.

20. The method of claim 1, further comprising:
estimating a timing drift based at least in part on the one or more reference signals, wherein the time synchronization is determined based at least in part on the estimated timing drift.

21. The method of claim 1, wherein the physical sidelink channel comprises a physical sidelink control channel or a physical sidelink shared channel.

22. The method of claim 1, wherein the one or more reference signals include at least one demodulation reference signal (DMRS).

23. An apparatus for wireless communication, comprising:
a processor,
memory coupled with the processor; and
instructions stored in the memory and executable by the processor to cause the apparatus to:
communicate control signaling scheduling a sidelink transmission via a physical sidelink channel;
receive, by a first user equipment (UE), the sidelink transmission comprising one or more reference signals from a second UE via the physical sidelink channel;
monitor the physical sidelink channel based at least in part on time synchronization, frequency synchronization, or both, determined using the one or more reference signals; and
receive location information of the second UE, wherein the time synchronization is determined based at least in part on the location information.

24. The apparatus of claim 23, further comprising a receiver, wherein the instructions are further executable by the processor to cause the apparatus to:
receive, via the receiver, the one or more reference signals in one or more reference signal symbol periods allocated within a resource of the physical sidelink channel for the sidelink transmission.

25. The apparatus of claim 23, further comprising a receiver, wherein the instructions are further executable by the processor to cause the apparatus to:
receive, via the receiver, synchronization confidence information from the second UE, wherein the time synchronization is determined using the one or more reference signals based at least in part on a synchronization confidence level satisfying a confidence threshold.

26. The apparatus of claim 25, wherein the instructions are further executable by the processor to cause the apparatus to:
receive the synchronization confidence information in an application layer message from the second UE.

27. The apparatus of claim 25, wherein the instructions are further executable by the processor to cause the apparatus to:
receive, by the first UE, a second sidelink transmission comprising one or more reference signals from a third UE; and
receive second synchronization confidence information from the third UE, wherein the time synchronization is determined without using the one or more reference signals of the second sidelink transmission based at least in part on a second synchronization confidence level not satisfying the confidence threshold.

28. An apparatus for wireless communication, comprising:
means for communicating control signaling scheduling a sidelink transmission via a physical sidelink channel;
means for receiving, by a first user equipment (UE), the sidelink transmission comprising one or more reference signals from a second UE via the physical sidelink channel;
means for monitoring the physical sidelink channel based at least in part on time synchronization, frequency synchronization, or both, determined using the one or more reference signals; and
means for receiving location information of the second UE, wherein the time synchronization is determined based at least in part on the location information.

29. A non-transitory computer-readable medium storing code for wireless communication, the code comprising instructions executable by a processor to:
communicate control signaling scheduling a sidelink transmission via a physical sidelink channel;
receive, by a first user equipment (UE), the sidelink transmission comprising one or more reference signals from a second UE via the physical sidelink channel;
monitor the physical sidelink channel based at least in part on time synchronization, frequency synchronization, or both, determined using the one or more reference signals; and
receive location information of the second UE, wherein the time synchronization is determined based at least in part on the location information.

* * * * *